H. JORDAN.
Seed-Planter.
No. 45,721.
Patented Jan. 3, 1865.
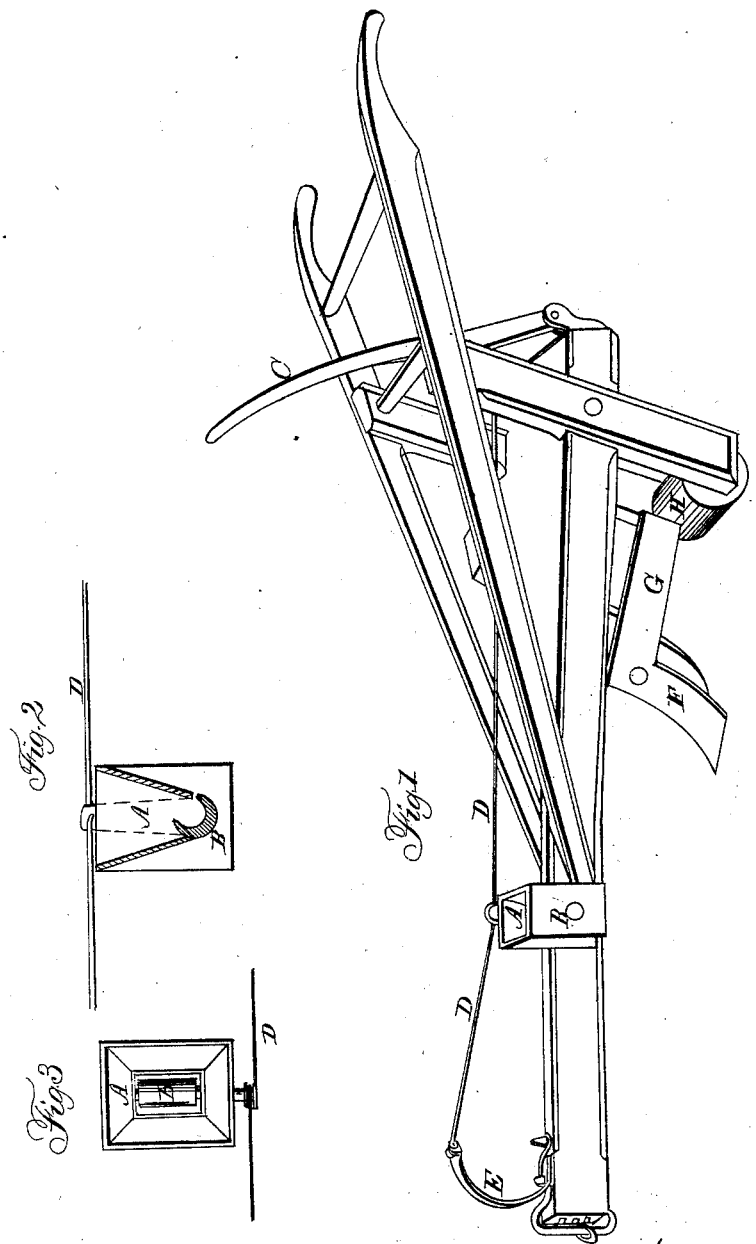

UNITED STATES PATENT OFFICE.

HIRAM JORDAN, OF MILFORD, OHIO.

IMPROVEMENT IN CORN-PLANTERS.

Specification forming part of Letters Patent No. 45,721, dated January 3, 1865.

*To all whom it may concern:*

Be it known that I, HIRAM JORDAN, of Milford, Clermont county, Ohio, have invented a new and useful Improvement in Corn-Planters; and I do hereby declare the following to be a full, clear, and exact description thereof, reference being had to the accompanying drawings, making part of this specification.

The most distinguishing features of my invention are, first, a peculiar form of grain-dropping mechanism adapted to operate with great precision, use, and certainty; second, a covering device which acts to remove the clods while covering the grains with the softer and more pliable portions of the soil.

Figure 1 is a perspective view of my planter. Figs. 2 and 3 are respectively a vertical section and a top view of the hopper.

The front and rear sides of the hopper or seed-box A converge toward their lower edges, where they are separated by a narrow aperture, which is occupied by a dropping-cylinder, B, having a crescent-like transverse section. The dropping-cylinder B is operated by the left hand of the husbandman through the medium of a lever, C, and rod D, and is retracted after each deposit by means of the spring E. The crescent form of the dropping-cylinder B is found to be admirably adapted to deposit a certain definite quantity of grain, neither more nor less, its upper angle acting to separate the exact quantity of grain required for a hill, and its lower angle acting to close the bottom of the hopper on the return-stroke, all without the jamming or entanglement of grains.

The covering and clod-removing device consists of a peculiarly-formed share, composed of a point, F, which acts to stir up the soft ground below the surface, and a wing, G, which acts to sweep off to one side the indurated and cloddy surface soil. The share F G is followed by a roller, H, which acts to press the ground snugly about the seed.

I claim herein as new and of my invention—

The arrangement of conveying-hopper A, crescent-shaped dropper B, lever C, rod D, spring E, share F G, and roller H, the whole being combined and operating together in the manner explained.

In testimony of which invention I hereunto set my hand.

HIRAM JORDAN.

Witnesses:
GEO. H. KNIGHT,
E. I. M. BROWN.